United States Patent
Kim et al.

(10) Patent No.: US 9,385,563 B2
(45) Date of Patent: Jul. 5, 2016

(54) ROTOR PERMANENT MAGNET APPARATUS FOR DRIVE MOTOR BASED ON TEMPERATURE DISTRIBUTION

(71) Applicant: Hyundai Motor Company, Seoul (KR)

(72) Inventors: Kyoung Bum Kim, Gyeonggi-do (KR);
Sang Hoon Moon, Gyeonggi-do (KR);
Hyoung Jun Cho, Seoul (KR); Jung Shik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 619 days.

(21) Appl. No.: 13/851,369

(22) Filed: Mar. 27, 2013

(65) Prior Publication Data

US 2014/0159528 A1    Jun. 12, 2014

(30) Foreign Application Priority Data

Dec. 12, 2012 (KR) .................. 10-2012-0144289

(51) Int. Cl.
*H02K 1/02* (2006.01)
*H01F 41/02* (2006.01)

(52) U.S. Cl.
CPC ............. *H02K 1/02* (2013.01); *H01F 41/0293* (2013.01)

(58) Field of Classification Search
CPC .............................. H02K 1/02; H01F 41/0293
USPC ........................ 310/156.01, 156.43, 156.53
IPC ......................................... H02K 1/02
See application file for complete search history.

(56) References Cited

U.S. PATENT DOCUMENTS

| | | | |
|---|---|---|---|
| 7,399,368 B2 * | 7/2008 | Komuro | H01F 1/086 148/103 |
| 8,303,732 B2 * | 11/2012 | Suzuki | C22C 1/0441 148/101 |
| 2008/0054736 A1 * | 3/2008 | Miyata | H02K 1/02 310/44 |
| 2010/0171386 A1 | 7/2010 | Kogure et al. | |
| 2011/0068651 A1 * | 3/2011 | Miyata | H02K 1/2766 310/156.43 |
| 2011/0080066 A1 * | 4/2011 | Doi | H02K 1/276 310/156.43 |
| 2011/0210810 A1 * | 9/2011 | Miyata | H01F 1/0557 335/302 |
| 2012/0111724 A1 * | 5/2012 | Kobayashi | H01J 37/3405 204/298.17 |
| 2012/0237795 A1 * | 9/2012 | Sakurai | G11B 5/855 428/800 |
| 2014/0159528 A1 * | 6/2014 | Kim | H01F 41/0293 310/156.01 |

FOREIGN PATENT DOCUMENTS

| | | |
|---|---|---|
| JP | 2007053351 A | 3/2007 |
| JP | 2011078268 A | 4/2011 |
| JP | 2011078269 A | 4/2011 |
| JP | 2012114418 A | 6/2012 |
| KR | 10-2011-0032988 | 3/2011 |

* cited by examiner

*Primary Examiner* — John K Kim

(74) *Attorney, Agent, or Firm* — Mintz Levin Cohn Ferris Glovsky and Popeo, P.C.; Peter F. Corless

(57) ABSTRACT

Disclosed herein is a rotor permanent magnet apparatus for a drive motor based on temperature distribution. The permanent magnet may enhance coercivity without a substantial decrease in magnetic flux density Br by applying a grain boundary diffusion process of diffusing dysprosium on the surface of the permanent magnet based on the temperature distribution of the permanent magnet.

3 Claims, 3 Drawing Sheets

ROTOR PERMANENT MAGNET APPARATUS FOR DRIVE MOTOR BASED ON TEMPERATURE DISTRIBUTION

CROSS-REFERENCE TO RELATED APPLICATION

This application claims under 35 U.S.C. §119(a) the benefit of Korean Patent Application No. 10-2012-0144289 filed Dec. 12, 2012, the entire contents of which are incorporated herein by reference.

BACKGROUND (a) Technical Field

The present invention relates to a rotor permanent magnet apparatus for a drive motor based on temperature distribution, in which a coercivity enhancing material is diffused on the surface of a permanent magnet, thereby improving coercivity without the loss of magnetic flux density.

(b) Background Art

In recent years, a permanent magnet type motor has been developed, which uses a magnet having the ability to attract or repel other magnetic materials and the ability to permanently generate a static magnetic field without using external energy. A physical difference from the magnet of other magnetic materials is that, for the permanent magnet, effective magnetization M remains after removal of an external magnetic field, and magnetization inversion (e.g., demagnetization) is initially induced under application of heat or a relatively large reversal magnetic field, therefore magnetization M decreases.

FIG. 1 is an exemplary simulation diagram showing the temperature distribution of a permanent magnet mounted within a rotor of a drive motor. When the driver motor operates under a continuous load of 4000 rmp, the temperature of a central portion of the permanent magnet mounted within the rotor increases (indicated by a darker shade in FIG. 1). The temperature increases because heat at the central portion of the permanent magnet is not substantially dissipated to the exterior of the permanent magnet. When the temperature at the central portion of the permanent magnet increases as described above, the permanent magnet may be demagnetized.

Moreover, magnets have different coercivities, and the coercivity affects the demagnetization of a magnet. For example, as the coercivity of the magnet increases, it may be difficult to demagnetize the magnet at high temperature. On the other hand, as the coercivity of the magnet decreases, it may be easier to demagnetize the magnet at high temperature. Therefore, a magnet having high coercivity may be used to prevent demagnetization of the permanent magnet.

Conventionally, dysprosium (Dy) was mixed with a neodymium (Nd) magnet to increase the content of Dy, thereby enhancing the coercivity of the magnet. However, when the content of Dy is increased, the coercivity of the magnet may be enhanced, but the remaining magnetic flux density Br decreases. When the content of Dy is increased to enhance the existing coercivity, the content of Dy is constantly applied to the central portion of the permanent magnet, which has high temperature, and both the ends of the permanent magnet, which have low temperature, and therefore, the entire cost of the permanent magnet increases.

SUMMARY

The present invention provides a rotor permanent magnet apparatus for a drive motor based on temperature distribution, which may enhance coercivity without a substantial decrease in magnetic flux density Br by applying a grain boundary diffusion process (GBDP) of diffusing Dy on the surface of a permanent magnet according to temperature distribution of the permanent magnet, and may reduce cost by decreasing the content of Dy.

In one embodiment, the present invention provides a rotor permanent magnet apparatus for a drive motor including: a permanent magnet mounted within a rotor the drive motor; and a coercivity enhancing material, formed on the surface of the permanent magnet to enhance coercivity of the permanent magnet; wherein a predetermined amount of the coercivity enhancing material is diffused on a portion of the permanent magnet, based on the temperature distribution to prevent demagnetization.

In an exemplary embodiment, the coercivity enhancing material may be dysprosium (Dy).

In another exemplary embodiment, the coercivity enhancing material may be formed by being diffused on the surface of the permanent magnet through a grain boundary diffusion process (GBDP), and the diffusion amount of the coercivity enhancing material may be changed based on the temperature distribution.

Advantages of the rotor permanent magnet apparatus for a drive motor based on temperature distribution are described as follows.

First, the diffusion amount of Dy applied to the surface of the permanent magnet is increased at the central portion of the permanent magnet, of which temperature is high, based on the temperature distribution of the permanent magnet, to prevent demagnetization. Further, the diffusion amount of Dy is decreased at both ends of the permanent magnet, of which temperature is substantially low, to increase the average magnetic flux density of the permanent magnet.

Second, Dy is not mixed with the existing Nd permanent magnet, instead, the diffusion amount of Dy is controlled by diffusing Dy on the surface of the permanent magnet, to reduce the amount and cost of Dy used without a substantial decrease in magnetic flux density.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

Figure 1:
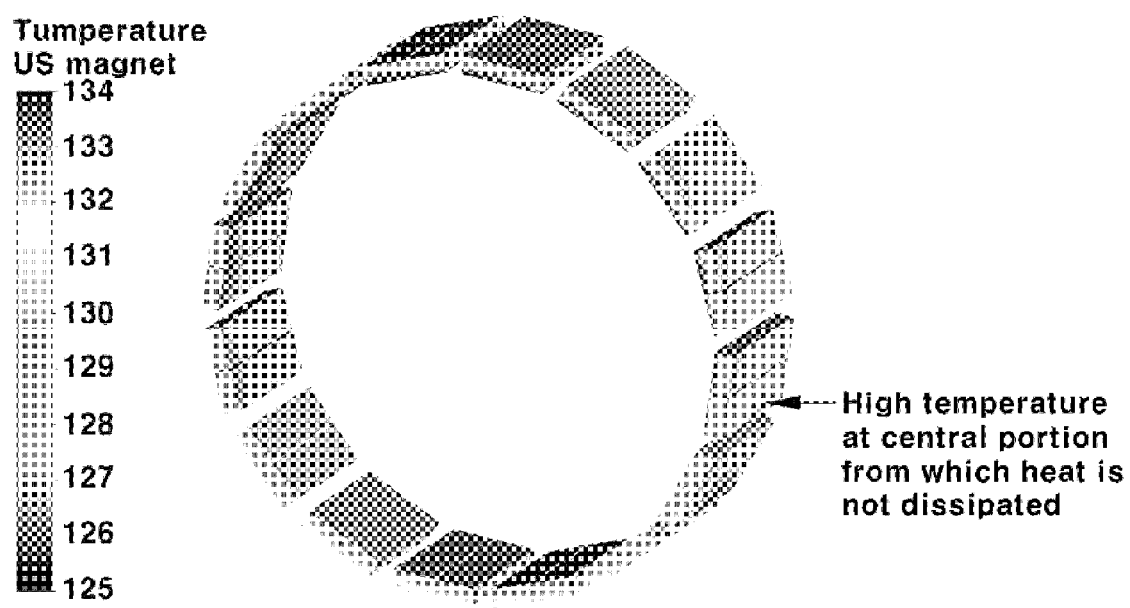
FIG. 1 is an exemplary view showing the temperature distribution of a permanent magnet mounted within a rotor applied to a conventional drive motor according to the related art.
Figure 2:
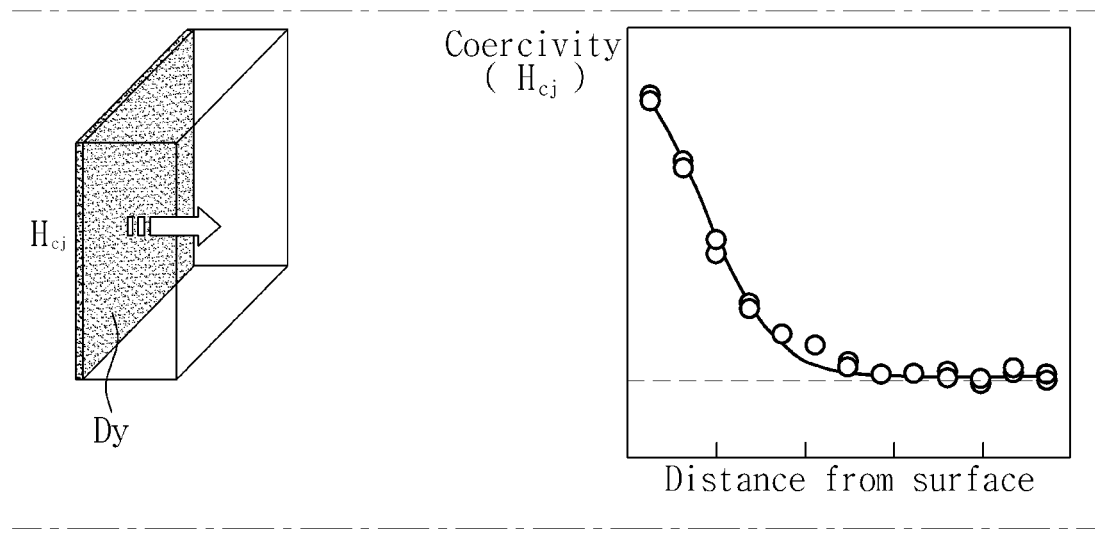
FIG. 2 is an exemplary view showing coercivities with respect to diffusion amounts of dysprosium (Dy) according to an exemplary embodiment of the present invention.
Figure 3:
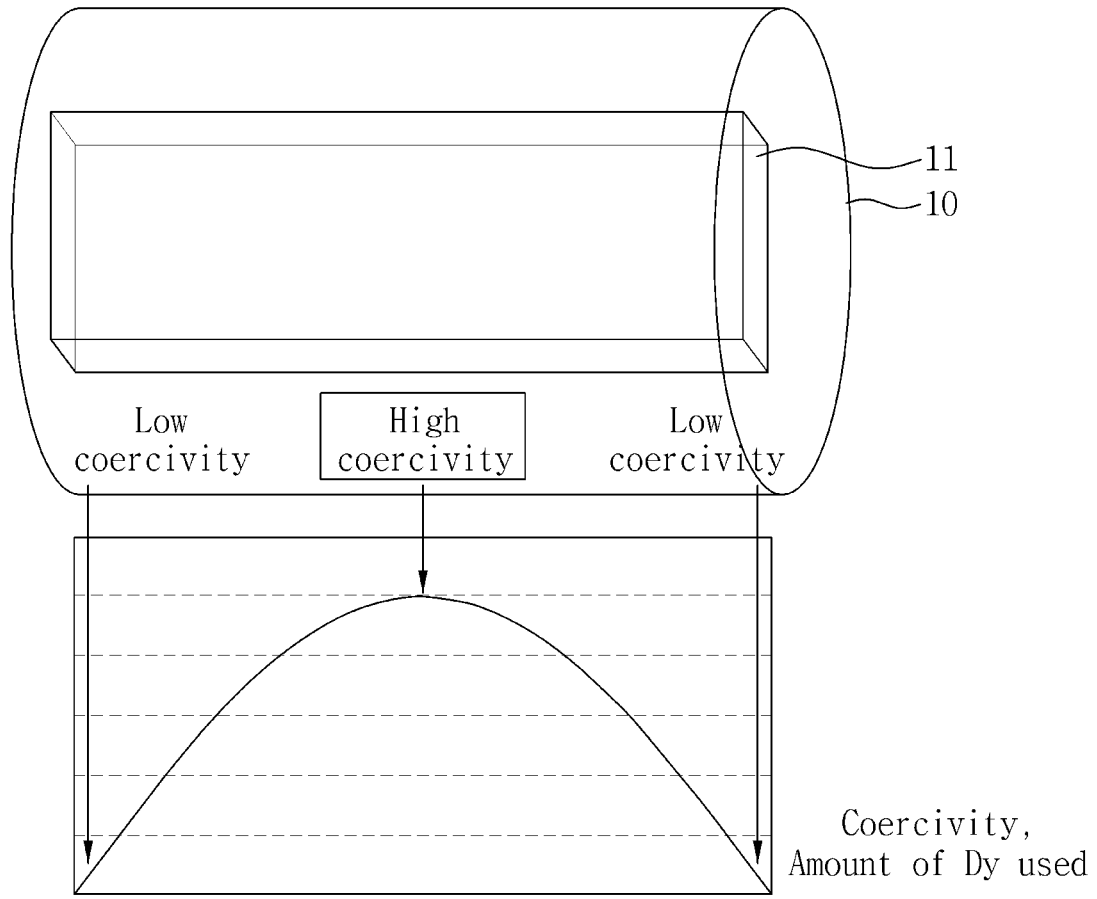
FIG. 3 is an exemplary view showing coercivities of a permanent magnet and amounts of dysprosium (Dy) used with respect to temperature distribution according to an exemplary embodiment of the present invention.

FIG. 2 is an exemplary view showing coercivities with respect to diffusion amounts of dysprosium (Dy) according to an exemplary embodiment of the present invention. FIG. 3 is an exemplary view showing coercivities of a permanent magnet and amounts of dysprosium (Dy) used with respect to temperature distribution according to an exemplary embodiment of the present invention.

The present invention relates to a rotor permanent magnet apparatus for a drive motor considering temperature distribution, which may enhance coercivity of a demagnetization weak portion of which temperature is high due to the lack of dissipation.

Specifically, in the present invention, a permanent magnet is made by applying a grain boundary diffusion process (GBDP) of diffusing Dy on the surface of the neodymium (Nd) magnet instead of mixing Dy with the existing Nd magnet. Accordingly, coercivity of the permanent magnet may be enhanced without a decrease in magnetic flux density.

When the GBDP is applied to a left side the Nd magnet as shown in FIG. 2, the coercivity with respect to the diffusion amount of Dy may change. In particular, the coercivity (Hcj) increases at a portion (e.g., surface) on which a substantially large amount of Dy is diffused, and the coercivity Hcj decreases at a portion (e.g., inner portion) on which a substantially small amount of Dy is diffused.

The present invention provides single permanent magnets 11 wherein Dy is diffused on the surface thereof using the GBDP, and coercivity may be substantially continuous in a vertical direction. The permanent magnets 11 may be mounted apart from one another at a predetermined interval within a rotor 10 of the driver motor.

Furthermore, the demagnetization weak portion where temperature increases due to the lack of dissipation may be a central portion of the permanent magnet 11. Thus, in the present invention, the largest amount of Dy may be diffused on the central portion where temperature increases on the surface of the permanent magnet 11, and a substantially small amount of Dy may be diffused on the ends portions of the permanent magnet 11. Additionally, the temperature may not rapidly increase as the central portion is approached from the end portions of the permanent magnet 11. Thus, when considering such temperature distribution, the diffusion amount of Dy according to the present invention may gradually increase at the central portion of the permanent magnet 11 or may gradually decrease at the end portions of the permanent magnet 11.

For example, the diffusion amount of Dy may decrease at one end of the permanent magnet 11, and may reach a maximum at the central portion of the permanent magnet 11 while gradually increasing as the portion of the permanent magnet 11 approaches the central portion of the permanent magnet 11. Then, the diffusion amount of Dy may decrease at the other end of the permanent magnet 11 to be substantially similar to the diffusion amount of Dy at the one end of the permanent magnet 11 while gradually decreasing as the portion of the permanent magnet 11 approaches the other end of the permanent magnet 11.

In particular, the coercivity is substantially low at both ends of the permanent magnet 11, while the magnetic flux density Br is substantially high. In addition, the coercivity is substantially high at the central portion of the permanent magnet 11, while the magnetic flux density Br is substantially low.

Thus, according to the present invention, the diffusion amount of Dy applied to the surface of the permanent magnet 11 may increase at the central portion of the permanent magnet 11, where temperature is measured to be substantially high, according to the temperature distribution of the permanent magnet 11, thus allowing demagnetization to be prevented. Further, the diffusion amount of Dy may decrease at both ends of the permanent magnet 11, where temperature is measured to be substantially low, allowing an increase in the average magnetic flux density of the permanent magnet 11. Specifically, the average magnetic flux density of the permanent magnet 11 may be increased higher than the conventional magnet of the related art.

In addition, Dy may not be mixed with the existing Nd permanent magnet, instead the diffusion amount of Dy may be controlled by diffusing Dy on the surface of the permanent magnet 11, allowing a reduction in the amount and cost of Dy used without causing a decrease in magnetic flux density.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A rotor permanent magnet apparatus within a drive motor, the apparatus comprising:
   a permanent magnet mounted within a rotor of the drive motor; and
   a material, formed on the surface of the permanent magnet that enhances coercivity of the permanent magnet, wherein a predetermined amount of the material is diffused on a portion of the permanent magnet, to prevent demagnetization,
   wherein the amount of the material is gradually increased as the portion of the permanent magnet approaches a central portion of the permanent magnet from both ends of the permanent magnet.

2. The apparatus of claim 1, wherein the material is dysprosium (Dy).

3. The apparatus of claim 1, wherein the material is formed by being diffused on the surface of the permanent magnet through a grain boundary diffusion process (GBDP), and the diffusion amount of the material is changed based on the temperature distribution.

\* \* \* \* \*